(12) United States Patent
Camp (10) Patent No.: US 11,780,530 B2
(45) Date of Patent: Oct. 10, 2023

(54) FLEXIBLE HARDWARE SPACER

(71) Applicant: SRAM, LLC, Chicago, IL (US)

(72) Inventor: David Camp, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 273 days.

(21) Appl. No.: 16/916,435

(22) Filed: Jun. 30, 2020

(65) Prior Publication Data

US 2021/0403120 A1    Dec. 30, 2021

(51) Int. Cl.
| | |
|---|---|
| *B62K 25/28* | (2006.01) |
| *F16B 43/00* | (2006.01) |
| *B60G 11/22* | (2006.01) |
| *F16F 1/38* | (2006.01) |
| *B62K 3/02* | (2006.01) |

(52) U.S. Cl.
CPC ............ *B62K 25/286* (2013.01); *B60G 11/22* (2013.01); *F16B 43/00* (2013.01); *F16F 1/38* (2013.01); *B62K 3/02* (2013.01)

(58) Field of Classification Search
CPC ........ B62K 25/286; B62K 3/02; B60G 11/22; F16B 43/00; F16B 2/04; F16F 1/38; F16F 1/3732; F16F 9/3242
See application file for complete search history.

(56) References Cited

U.S. PATENT DOCUMENTS

| | | | | |
|---|---|---|---|---|
| 4,088,882 A | * | 5/1978 | Lewis | B62J 6/01 340/432 |
| 5,975,550 A | * | 11/1999 | Schonfeld | B62K 25/28 280/284 |
| 6,276,706 B1 | * | 8/2001 | Yih | B62K 25/28 280/283 |
| 6,450,520 B1 | | 9/2002 | Girard | |
| 6,880,846 B2 | * | 4/2005 | Schonfeld | B62K 25/28 280/277 |
| 8,033,558 B2 | * | 10/2011 | Earle | B62K 25/286 280/283 |
| 8,430,417 B1 | * | 4/2013 | Galson | B62K 25/28 280/284 |
| 8,439,383 B2 | | 5/2013 | Talavasek | |
| 9,908,583 B2 | | 3/2018 | Matheson et al. | |
| 2003/0106733 A1 | * | 6/2003 | Keller | B62K 11/04 370/336 |

(Continued)

FOREIGN PATENT DOCUMENTS

| | | | | |
|---|---|---|---|---|
| CN | 201099168 Y | * | 8/2008 | |
| FR | 2850720 A1 | * | 8/2004 | ............ B60S 1/0444 |

(Continued)

OTHER PUBLICATIONS

Amazon.com "RockShox Rear Shock Mounting Hardware-3-Piece-Set (1/2X1/2-Inch 22.0x8-mm", Jun. 29, 2020, 10 pages, https://www.amazon.com/RockShox-Mounting-Hardware-3-Piece-2-Inch-22-0x8-mm/dp/B0062N5ELE/ref=pd_lpo_200_t_0/147-1731964-8910218?_encoding=UTF8&pd_rd_i=B0062N5EL.

(Continued)

*Primary Examiner* — Drew J Brown (57) ABSTRACT

A spacer for connecting a suspension component to a frame of a bicycle includes a spacer body and a flexible portion disposed at one end of the spacer body and configured to exert an axial bias force under compression. The spacer body and the flexible portion form a unitary part.

18 Claims, 12 Drawing Sheets

(56) References Cited

U.S. PATENT DOCUMENTS

| | | | | |
|---|---|---|---|---|
| 2005/0127636 A1* | 6/2005 | Czysz | ............... | B62K 21/02 |
| | | | | 180/219 |
| 2008/0238030 A1* | 10/2008 | Tseng | ............ | G06F 30/3312 |
| | | | | 280/284 |
| 2015/0259023 A1* | 9/2015 | Nago | ............... | B62K 19/40 |
| | | | | 280/279 |

FOREIGN PATENT DOCUMENTS

| | | | |
|---|---|---|---|
| GB | 1118519 A | * | 7/1968 |
| TW | 470003 U | | 12/2001 |

OTHER PUBLICATIONS

Enduroforkseals.com; "Shock Eyelet Bearing Kits—NBK Spares", Jun. 29, 2020, 2 pages, https://www.enduroforkseals.com/products/rear-suspension/shock-eyelet-bearing-kits/nb-spares/4115-SEALED-SPACER.html.

SRAM, LLC, "2013 Monarch RL/RT Service Manual", GEN. 0000000004177 Rev B, (2012), 40 pages.

TFTUNED, "Mount Kits and Bushings for Rear Shocks", Jun. 29, 2020, 4 pages, https://www.tftuned.com/tech-help/71-mount-kits-and-bushings-for-rear-shocks-a-guide.

* cited by examiner

FLEXIBLE HARDWARE SPACER

FIELD OF THE DISCLOSURE

The present disclosure is generally directed to a spacer for a bicycle, specifically, the present disclosure relates to a bicycle suspension component spacer having a flexible part.

DESCRIPTION OF RELATED ART

A bicycle may include one or more suspension components to improve ride quality. The suspension component, for example a spring and/or a damper, may be mounted to a frame of the bicycle by a mounting shaft passing through an eyelet of the suspension component. A fastener, such as a mounting bolt, may pass through the mounting shaft and affix the shaft to the frame. One or more bushings may support the eyelet on the mounting shaft, allowing for rotation of the suspension component about the shaft.

SUMMARY

In one example, a spacer for connecting a suspension component to a frame of a bicycle, the spacer includes a spacer body, and a flexible portion disposed at one end of the spacer body and configured to exert an axial bias force under compression. The spacer body and the flexible portion form a unitary part.

In one example, the spacer body and the flexible portion are formed from a single material.

In one example, the material is a non-metallic material.

In one example, the non-metallic material is a polymer, a plastic, or a rubber.

In one example, the spacer body has an outer annular surface and an inner annular surface partially defining an annular wall that extends along a length of the spacer body. The annular wall does not include any openings extending radially through the annular wall.

In one example, the inner annular surface of the spacer body has a diameter that is the same as or less than a diameter of an outer surface of a mounting shaft configured to connect the suspension component to the frame of the bicycle.

In one example, the spacer is secured to the mounting shaft by a press-fitting.

In one example, the flexible portion includes one or more circumferential ribs or circumferential ridges.

In one example, a suspension assembly for a bicycle includes a mounting portion of a suspension component, a mounting shaft sized and shaped to be disposed through the mounting portion of the suspension component and extend a distance to a support of the bicycle, and a spacer formed as a single unitary piece, the spacer spanning an entirety of the distance and being compressible in an axial direction.

In one example, the spacer is a first spacer, the distance is a first distance, the mounting shaft is sized and shaped to extend a second distance to a second support of the bicycle. The suspension assembly includes a second spacer formed as a single unitary part, the spacer spanning the entirety of the second distance and being compressible in the axial direction.

In one example, the spacer includes a flexible portion having one or more circumferential ribs or circumferential ridges. The flexible portion is configured to exert an axial bias force under compression.

In one example, the suspension component includes a spring, a damper, or a combination thereof.

In one example, a fixing member is disposed inside of the mounting shaft and configured to secure the suspension component to the support of the bicycle.

In one example, a diameter of the inner annular surface of the spacer is the same as or less than a diameter of the outer surface of the mounting shaft.

In one example, the spacer is secured to the mounting shaft by a press-fitting.

In one example, a flexible portion of the spacer abuts the mounting portion of the suspension component.

In one example, mounting shaft includes a collar with a diameter greater than a diameter of a body of the mounting shaft. The collar is sized and shaped to be disposable adjacent a side of the mounting portion of the suspension component and opposite the spacer.

In one example, the spacer is made from a non-metallic material.

In one example, the non-metallic material is a polymer, a plastic, or a rubber.

In one example, a suspension component includes a mounting portion, the mounting portion having a hole, and a spacer formed as a single unitary piece, the spacer sized and shaped to be disposed between the mounting portion and a support of a bicycle.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

One or more spacer sleeves may be disposed on the shaft to prevent side-to-side motion of the suspension component eyelet. Traditional spacer sleeves may be rigid. The spacer sleeves may be undersized (e.g. shorter than the distance from the eyelet to the frame) so that the clamping force holding the shaft and frame together (e.g. from the mounting bolt) is not applied to the eyelet. However, because the spacer sleeves are undersized, the eyelet and suspension component may still move laterally. The lateral movement may cause noise and excess wear on components, such as the bushing. The undersized spacer sleeves may also leave a gap between the spacer and the eyelet. Dirt, debris, and water may enter through the gap and contaminate the bushing or other components.

If the spacer sleeves are too wide, however, the clamping force may be transferred through the rigid spacer sleeve to the eyelet. The force on the eyelet may cause excess friction and wear on the eyelet, the frame, or other components.

The undersizing or oversizing of the spacers may be compensated for with an O-ring seal. For example, the O-ring may be disposed between the rigid spacer and the suspension component eyelet. However, because the O-ring may be smaller in width as compared to the spacer, the combined flexibility of the spacer and O-ring is limited. The limited flexibility may not sufficiently or significantly reduce the clamping force transferred to the eyelet. As a result, the clamping force transferred to the eyelet form the rigid spacer may cause excess wear on the eyelet or other parts of the suspension component. Further, the gap between the O-ring and the spacer provides an entry point for dirt, debris, and water. The two-piece spacer (e.g. the rigid spacer with O-ring) may be more complicated or expensive to manufacture and install on the mounting shaft.

A flexible, compressible, and/or deformable spacer may provide a solution to one or more of the problems described above. The flexible spacer may be installed between the suspension component eyelet and the frame of the bicycle. The spacer may be flexible in an axial direction. The axial flexibility may allow for the flexible spacer to locate the suspension component eyelet on the mounting shaft without causing excess friction or, in some cases, transferring all of the clamping force from the mounting bolt to the eyelet. Additionally, the flexible spacer may be in contact with the eyelet of the suspension component. By contacting the eyelet, the flexible spacer may prevent the ingress of dirt, debris, and water into the eyelet and bushing. In this way, the flexible spacer may be installed without an additional O-ring, thereby reducing cost and complexity. Further, the flexible spacer may compensate for a variation in the length or diameter of the mounting shaft, bushing, eyelet, or of the flexible spacer itself. For example, manufacturing tolerances may result in varying lengths across different mounting shafts, and one flexible spacer may be suitable for installation on mounting shafts of different lengths. In a further example, a flexible spacer may be suitable for installation with suspension component eyelets of varying widths, thereby reducing the number of different parts that may be produced for different bicycle and suspension component configurations.

The flexible properties of the spacer may be caused by or due to a geometry of the spacer, a material of the spacer, or a combination. For example, the spacer may be made from a polymer, plastic, or rubber with flexible properties. In another example, a portion of the spacer may have a narrow or articulated portion that may flex. In a further example, the spacer may include one or more circumferential ribs or ridges. Portions of the spacer between the ribs or ridges may compress under force, causing the spacer to flex.

Figure 1:
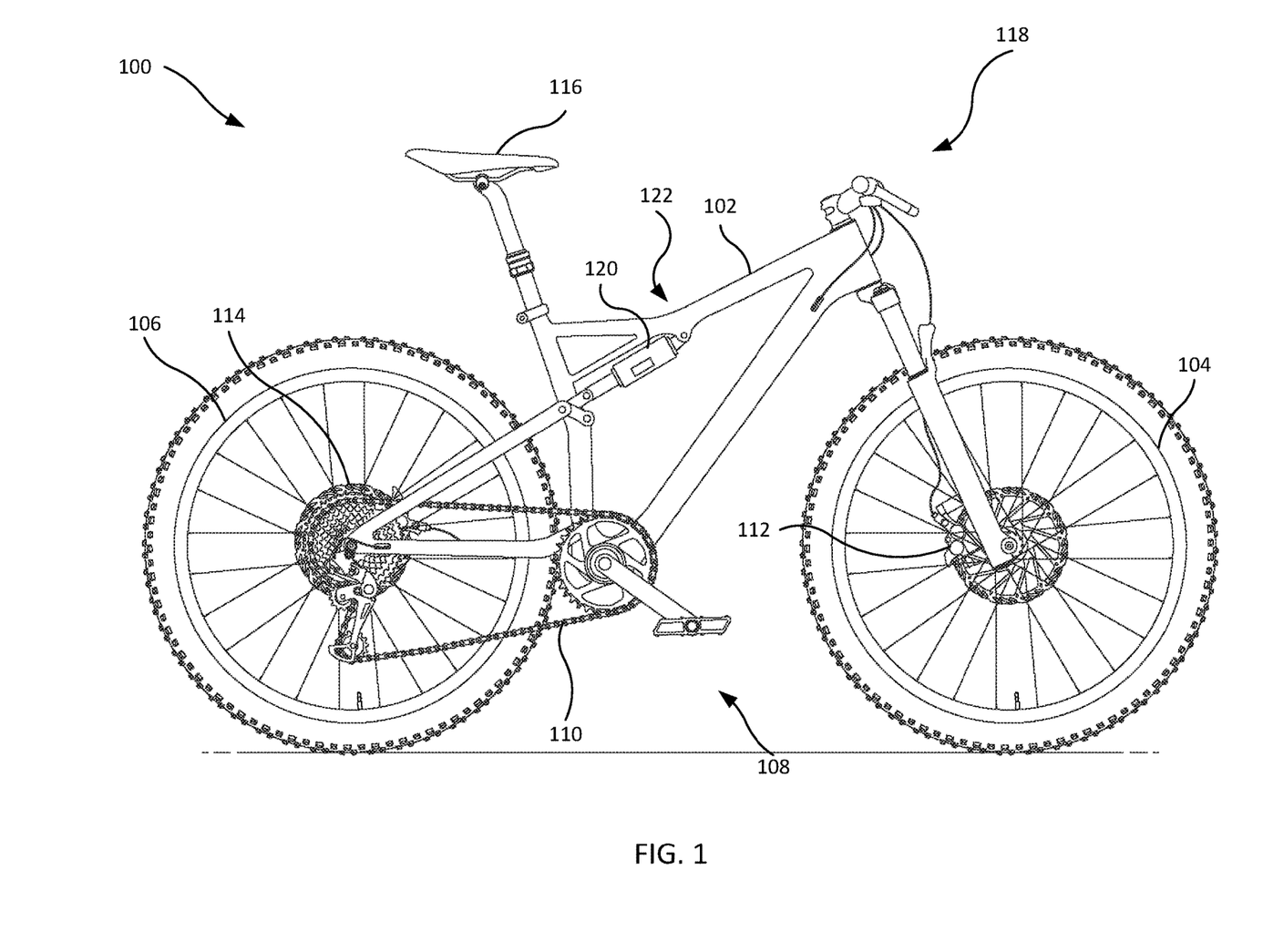
FIG. 1 is a side view schematic of a bicycle fitted with a suspension component and a flexible spacer in accordance with the teachings of this disclosure.
Figure 2:
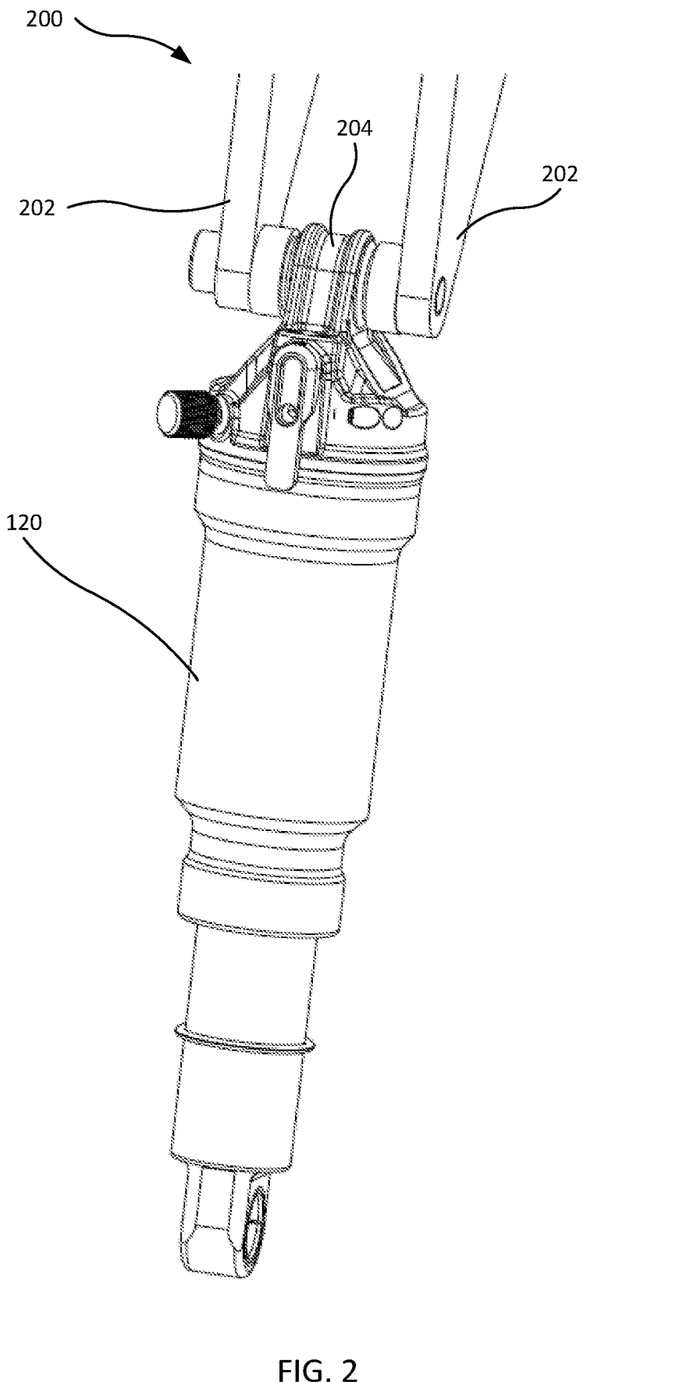
FIG. 2 is a side view of a suspension component and a flexible spacer in accordance with the teachings of this disclosure, attached to a frame of a bicycle, such as the bicycle of FIG. 1.
Figure 3:
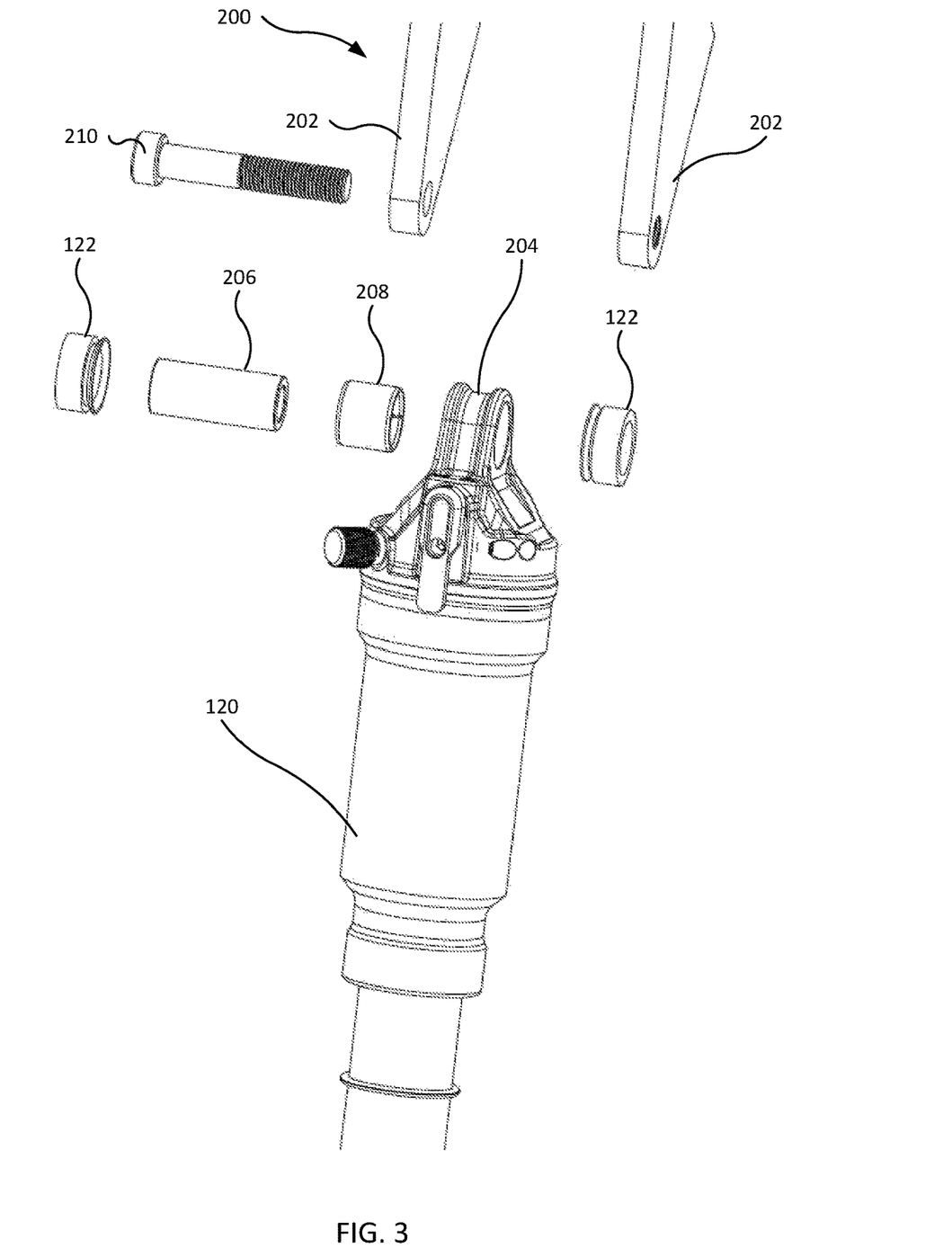
FIG. 3 is an exploded side view of the suspension component and flexible spacer of FIG. 2.
Figure 4:
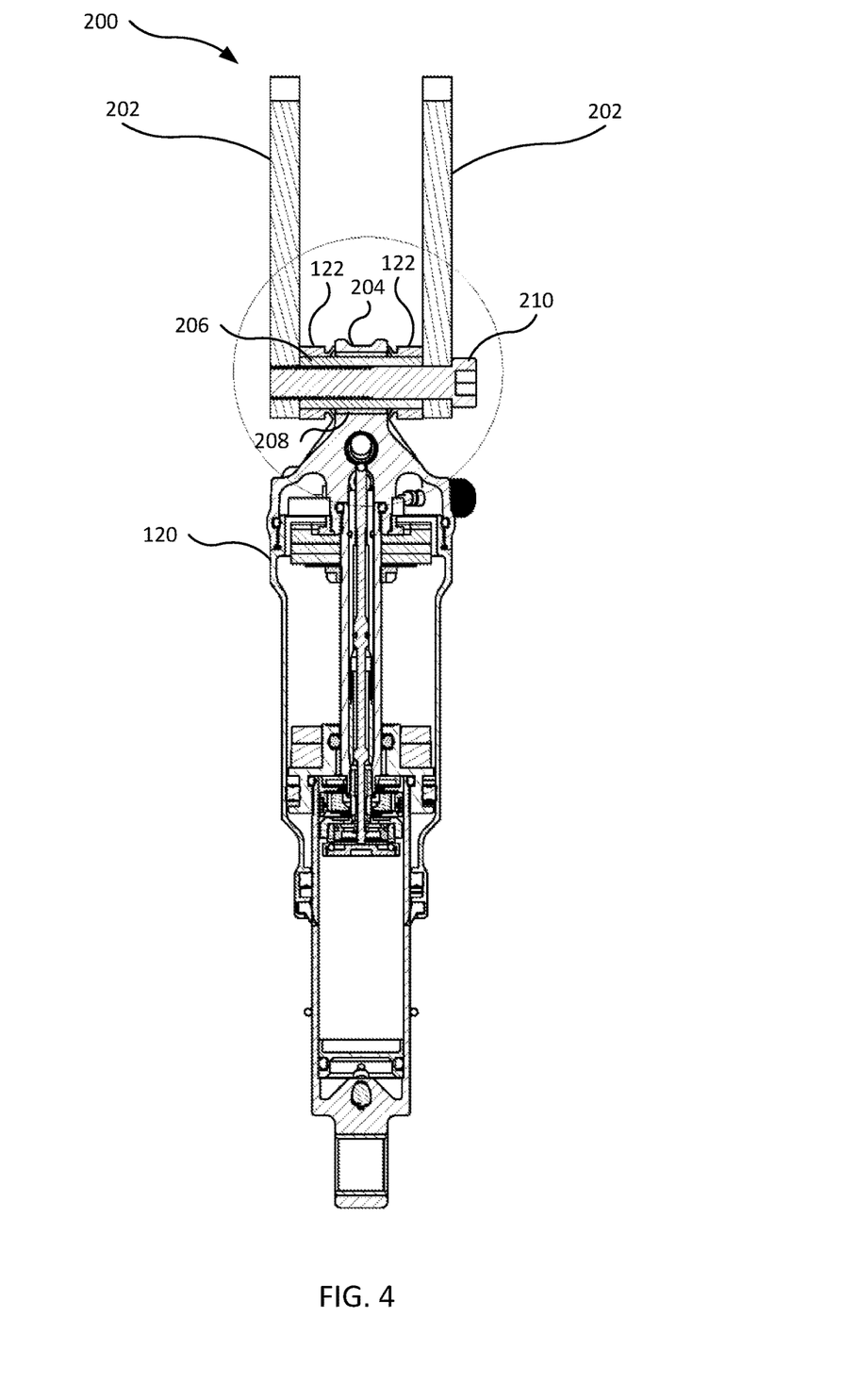
FIG. 4 is a cross-sectional view of the suspension component and flexible spacer of FIG. 2.
Figure 5:
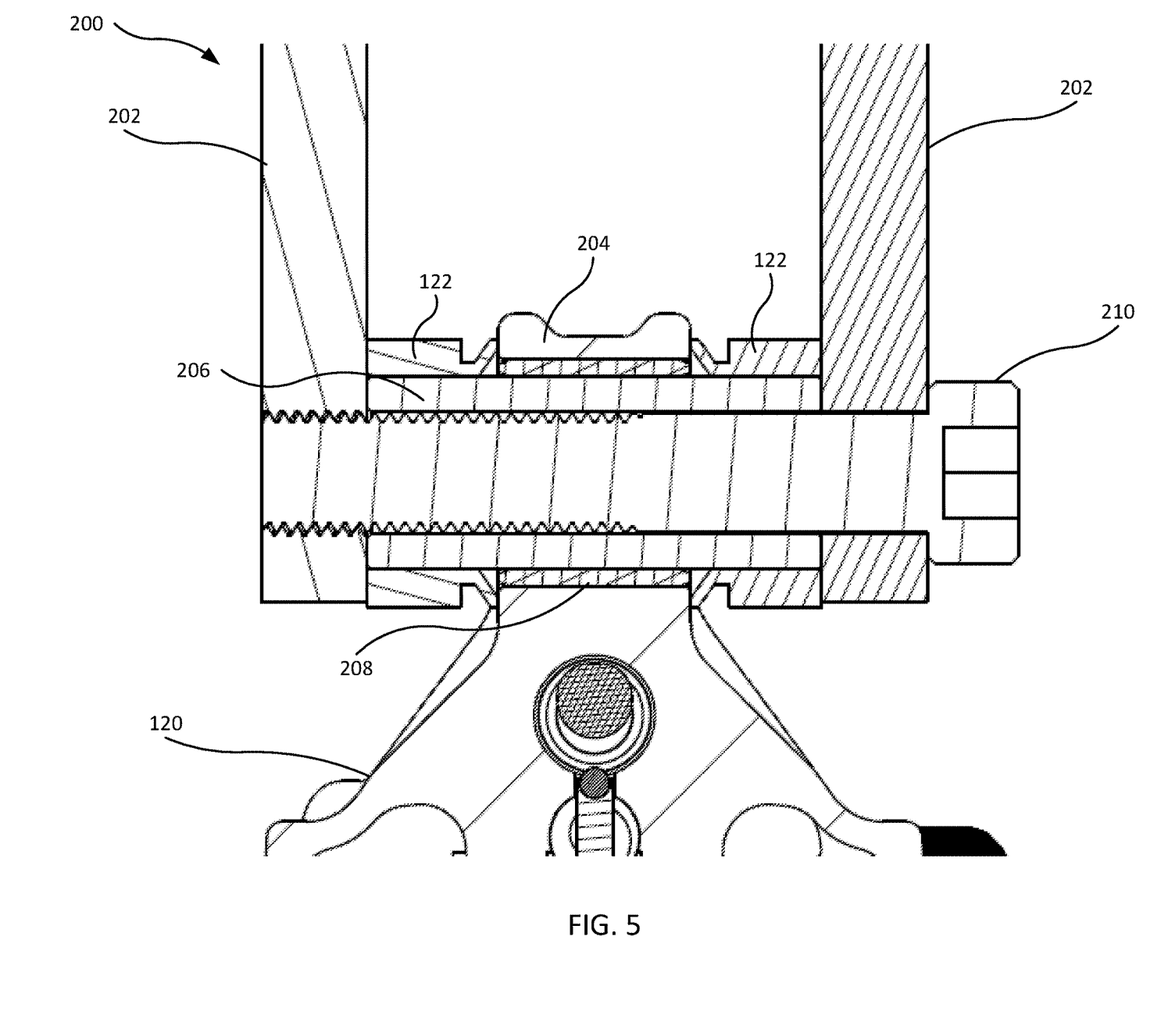
FIG. 5 is a detail view of the suspension component and flexible spacer of FIG. 4.

Turning now to the drawings, FIG. 1 generally illustrates one example of a bicycle 100 on which a flexible spacer of one or more of the present embodiments may be installed. In the example shown, the bicycle 100 is a mountain bicycle. The bicycle 100 has a frame 102 supported on a front wheel 104 and a rear wheel 106. A drivetrain 108 is arranged to provide power to the rear wheel 106 via a chain 110. A front brake 112 and a rear brake 114 are arranged to slow rotation of the front wheel 104 and the rear wheel 106, respectively. A saddle 116 is provided to support the rider during use of the bicycle 100. A handlebar assembly 118 is arranged to control a direction of the front wheel 104 and communicate with the drivetrain 108, the front brake 112, and the rear brake 114 to control operation thereof. Further, a suspension component 120, such as a spring, a damper, or a combination thereof, may be attached to the frame 102 to improve ride quality. The flexible spacer 122 may be disposed between the frame 102 and the suspension component 120.

It is to be understood that the specific arrangement and illustrated components of the frame 102, front wheel 104, rear wheel 106, drivetrain 108, front brake 112, rear brake 114, saddle 116, and suspension component 120 are non-limiting to the disclosed embodiments. For example, while the front brake 112 and the rear brake 114 are illustrated as hydraulic rim brakes, hydraulic disc brakes are contemplated and encompassed within the scope of the disclosure. In another example, different positions and orientations of the suspension component 120 are contemplated and encompassed within the scope of the disclosure. In a further example, while the suspension component 120 may be illustrated and/or described as a spring or a damper, other suspension components 120 other than a spring or a damper are contemplated and encompassed within the scope of the disclosure.

While the bicycle 100 depicted in FIG. 1 is a mountain bicycle, the flexible spacer 122, including the specific embodiments and examples disclosed herein as well as alternative embodiments and examples, may be implemented on other types of bicycles. For example, the disclosed flexible spacer may be used on road bicycles.

Referring to FIGS. 2-5, the suspension component 120 and the flexible spacer 122 are shown in greater detail. The suspension component 120 is shown installed on the bike frame 102. The suspension component 120 may be secured to a mounting portion 200 of the frame 102. The mounting portion 200 may include one or more extensions or mounting tabs 202. In some cases, the suspension component may be secured between two mounting tabs 202.

The suspension component 120 may include a mounting portion 204, such as an eyelet. The eyelet 204 may be located at an end of the suspension component 120. The eyelet 204 may ride on a mounting shaft 206 and thereby be secured to the bicycle frame 102 via the one or more mounting tabs 202. The eyelet 204 may allow for the suspension component 120 to rotate on the mounting shaft 206. The eyelet 204 may have a circular cross section. Other cross-sectional shapes for the eyelet 204 may be used.

In some cases, a bushing 208 may be disposed inward of the eyelet 204. For example, the eyelet 204 may ride on the mounting shaft 206 and rest on the bushing 208 disposed between the eyelet 204 and the mounting shaft 206. The bushing 208 may be press fit into or onto the eyelet 204. The bushing 208 may prevent the eyelet 204 and mounting shaft 206 from rubbing together and causing excess wear. Additionally, the bushing 208 may dampen a force transferred to the frame 102 from the suspension component 120. In some cases, the bushing 208 may be made from a polymer or non-metallic material. In some other cases, the bushing 208 may be made from metal. For example, the bushing 208 may be a bearing, such as a pin bearing.

The mounting shaft 206 may support the suspension component 120. For example, the eyelet 204 of the suspension component 120 (and/or the bushing 208) may be disposed on the mounting shaft 206. The mounting shaft may be sized and shaped to be disposed through the eyelet 204. A length of the mounting shaft 206 may extend a distance through the eyelet 204 to a mounting tab 202. In one example, the length of the mounting shaft 206 may extend the distance from one mounting tab 202 of the frame 102 to another mounting tab 202. The spacer 122 may extend the entirety of the distance or the length of the mounting shaft 206 from the eyelet 204 to the mounting tab 202. In some cases, the width the mounting shaft may be wider or narrower than the distance between the mounting tabs 202. A wider mounting shaft 206 may be more securely fixed to the mounting tabs 202, thereby providing a stable connection between the suspension component 120 and the frame 102. A narrower mounting shaft 206 may accommodate different frames 102 with different distances between the mounting tabs 202.

In some cases, the mounting shaft 206 may have a threaded portion. For example, the mounting shaft 206 may thread into a mounting tab 202 or a nut. The mounting shaft 206 may have a head, for example, opposite the threaded portion. The head may have a larger diameter than a hole in the mounting tab 202 through which a body of the mounting shaft 206 extends. The threaded portion, and/or the head may secure the mounting shaft 206 to the frame 102.

In some other cases, the mounting shaft 206 may be hollow or may have an interior void. A fixing member 210, such as a fastener or mounting bolt, may extend through the interior void of the mounting shaft 206. The fixing member 210 may thread into the mounting tab 202 or a nut. The fixing member 210 may secure the mounting shaft 206 to the frame 102. In this way, the fixing member 210 may exert or cause to be exerted a clamping force across the mounting tabs 202. For example, as the fixing member 210 is tightened, the mounting tabs 202 may be drawn together against the mounting shaft 206 due to the clamping force. In other words, opposite ends of the mounting shaft 206 abut the mounting tabs 202, respectively, after the fixing member 210 has been tightened. When the eyelet 204 is disposed between the mounting tabs 202, the flexible spacer 122 may reduce a transfer of the clamping force to the eyelet 204.

The flexible spacer 122 may be disposed between the eyelet 204 and the mounting tab 202 of the frame 102. The spacer 122 may abut a side of the eyelet 204 and an inner surface of the mounting tab 202. In some cases, a single spacer 122 may be used. In some other cases, two spacers 122 or another number of spacers 122 may be used. For example, one spacer 122 may be disposed on one side of the eyelet 204, and another spacer 122 may be disposed on the other side of the eyelet 204, such that the eyelet 204 is between the two spacers 122.

Figure 6A:
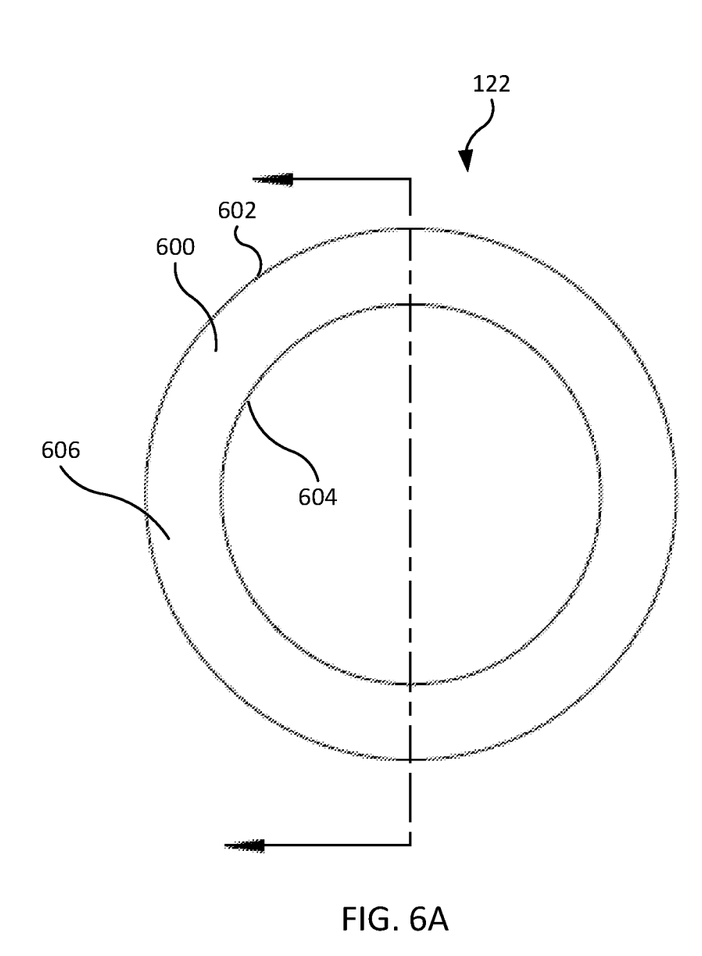
FIG. 6A is a top-down view of the flexible spacer of FIG. 3.
Figure 6B:
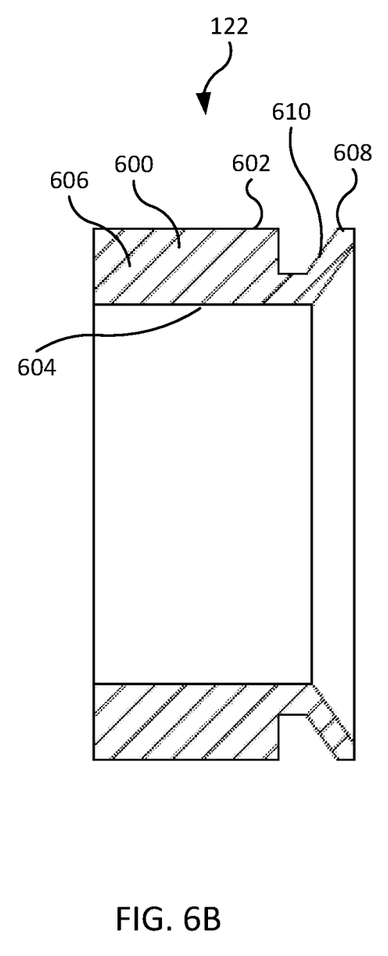
FIG. 6B is a cross-sectional view of the flexible spacer of FIG. 6A.
Figure 7:
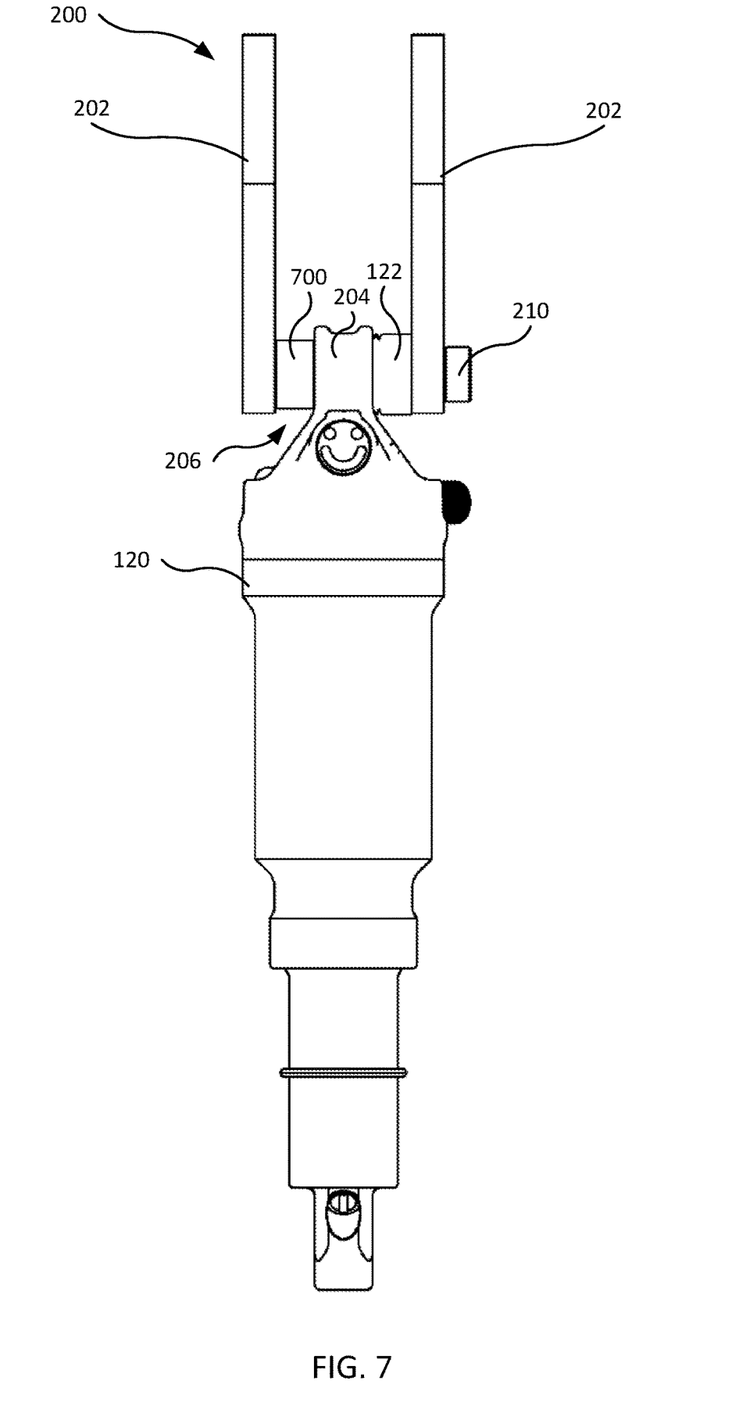
FIG. 7 is a side view of a suspension component, a flexible spacer, and a mounting shaft in accordance with the teachings of this disclosure, attached to a frame of a bicycle, such as the bicycle of FIG. 1.

Referring to FIGS. 6A and 6B, the spacer 122 may have a body 600 that is cylindrical shell. The spacer 122 may be a single unitary part and/or formed from a single material. For example, the spacer 122 may include a body and a flexible portion that are a unitary part or formed from a single material. The spacer may be made from a flexible material. In some cases, the spacer 122 may be made from a non-metallic material. For example, the spacer 122 may be made from plastic, a polymer, or a rubber. The single unitary part may reduce the number of gaps (e.g. as compared to a rigid spacer and O-ring) through which dirt, debris, and water may ingress and cause excess wear on the eyelet 204, the mounting shaft 206, and the bushing 208. Further, the flexible spacer 122 may reduce the magnitude of the clamping force transferred to the eyelet 204.

The body 600 or shell of the spacer 122 may have an outer surface 602 (e.g., an outer annular surface) and an inner surface 604 (e.g., an inner annular surface). A wall 606 of the body or shell 600 may be defined by the outer surface 602 and the inner surface 604. The wall 606 may extend along a length of the body 600. In some cases, the wall 606 may be radially complete. For example, there may be no openings extending radially through the wall 606. In some other cases, the wall 606 may include one or more radial openings. The radial openings may extend less than a thickness of the wall 606 (e.g. less than the distance from the outer surface 602 to the inner surface 604), or may extend less than a length of the body 600. The inner surface 604 may conform to an outer surface of the mounting shaft 206. For example, a diameter of the inner surface 604 may be less than or equal to a diameter of an outer surface of the mounting shaft 206. For example, because the spacer 122 is flexible, the diameter of the inner surface 604 may be less than the diameter of the mounting shaft 206. The spacer 122 and the mounting shaft 206 may be press-fit together such that the spacer 122 is secured to the mounting shaft 206. The diameter of the inner surface 604 may provide a snug or secure fit on the mounting shaft 206.

The spacer may include a flexible portion 608. The flexible portion 608 may be disposed at an end of the body 600 or away from (e.g., adjacent to) the end of the body 600. For example, the flexible portion 608 may abut the eyelet 204 when the spacer 122 is installed. In some cases, a length of the flexible portion 608 may be less than the length of the body 600. A geometry of the flexible portion 608 may allow for the spacer 122 to flex. In an embodiment the flexible portion may include a variable cross-sectional area along a length. The changing cross sectional area may provide for a constant, adaptive, or variable spring rate along the length. For example, the flexible portion 608 may include one or more articulations 610. The articulations 610 may be one or more ribs, ridges, or valleys. The articulations 610, such as the ribs or ridges, may be circumferential. In some cases, the articulations 610 may have a different diameter than the body 600 (e.g. may be broader or narrower than the body 600) such that the ribs, ridges, or valleys 610 protrude from or are recessed from the body 600. The articulations 610 (including e.g. the spaces between the ribs or ridges) may compress under force, causing the spacer 122 to flex. For example, the clamping force may cause the spacer 122 to compress. While flexing, the overall length of the spacer 122 (e.g. including the body 600 and the flexible portion 608) may decrease.

While under compression, the spacer 122 may exert a bias force outward and axially. The bias force may be exerted on the eyelet 204 and/or one or more of the mounting tabs 202. A magnitude of the bias force may be dependent on or determined by a length of the flexible portion 608, a spring rate of the material of the spacer 122, and/or an extent to which the spacer 122 is compressed.

Referring to FIGS. 7-9B, the suspension component 120 and another example of the flexible spacer 122 are shown in greater detail. As shown in FIGS. 2-5, the suspension component 120 may installed on the bike frame 102, for example, secured to a mounting portion 200 of the frame 102 that may include one or more extensions or mounting tabs 202. The suspension component 120 may include an eyelet 204 that may allow for the suspension component 120 to rotate on a mounting shaft 206. In some cases, a bushing 208 may be disposed inward of the eyelet 204 so that the eyelet 204 may ride on the mounting shaft 206 and rest on the bushing 208. A fixing member 210, such as a fastener or mounting bolt, may secure the suspension component 120 to the frame mounting tabs 202.

A flexible spacer 122 may be disposed on one side of the eyelet 204. The flexible spacer 122 may locate the eyelet 204 axially on the mounting shaft 206 and prevent excess axial movement of the suspension component 120. In this example, a single flexible spacer 122 may be used. A single spacer 122 may reduce the overall number of parts needed to install the suspension component 120 on the bicycle 100. Further, a single spacer 122 may accommodate a larger variety of different suspension components 120 and bicycles 100 (e.g. as compared to two spacers or to one or more rigid spacers), thereby reducing manufacturing cost and complexity.

The mounting shaft 206 may have a collar 700. The collar 700 may have an outside diameter greater than an outside diameter of a body 702 of the mounting shaft 206. In this way, the collar 700 may protrude beyond the body 702 of the mounting shaft 206. The collar 700 may be sized and shaped to be disposable adjacent the eyelet 204 and opposite the spacer 122. In this way, the collar 700 may, alone or in conjunction with the spacer 122, locate the eyelet 204 axially on the mounting shaft 206 to prevent excess axial motion of the eyelet 204. The collar 700 may be disposed at an end of the mounting shaft 206 or away from (e.g., adjacent to) an end of the mounting shaft 206. In some cases, the collar 700 may be disposed between the eyelet 204 and the mounting tab 202. The collar 700 may be disposed on one side of the eyelet 204, opposite from another side of the eyelet 204 where the spacer 122 is disposed. In this way, the eyelet 204 may be disposed between the collar 700 and the spacer 122.

By integrating the collar 700 into the mounting shaft 206, the eyelet 204 of the suspension component 120 may be located between the mounting tabs 202 without two spacers 122 disposed on each side of the eyelet 204. The collar 700 may abut the mounting tab 202 and be held in place because the clamping force acts against and through the mounting shaft 206. In this way, the collar 700 may remain securely in place relative to the mounting tabs 202 and may have minimal axial motion. The spacer 122 disposed on the other side of the eyelet 204, abutting the eyelet 204 and another mounting tab 202, may exert an axial bias force against the eyelet 204. The axial bias force, further described below, may provide a bias to keep the eyelet 204 against the collar 700 and bias against any axial movement of the eyelet 204.

Figure 8:
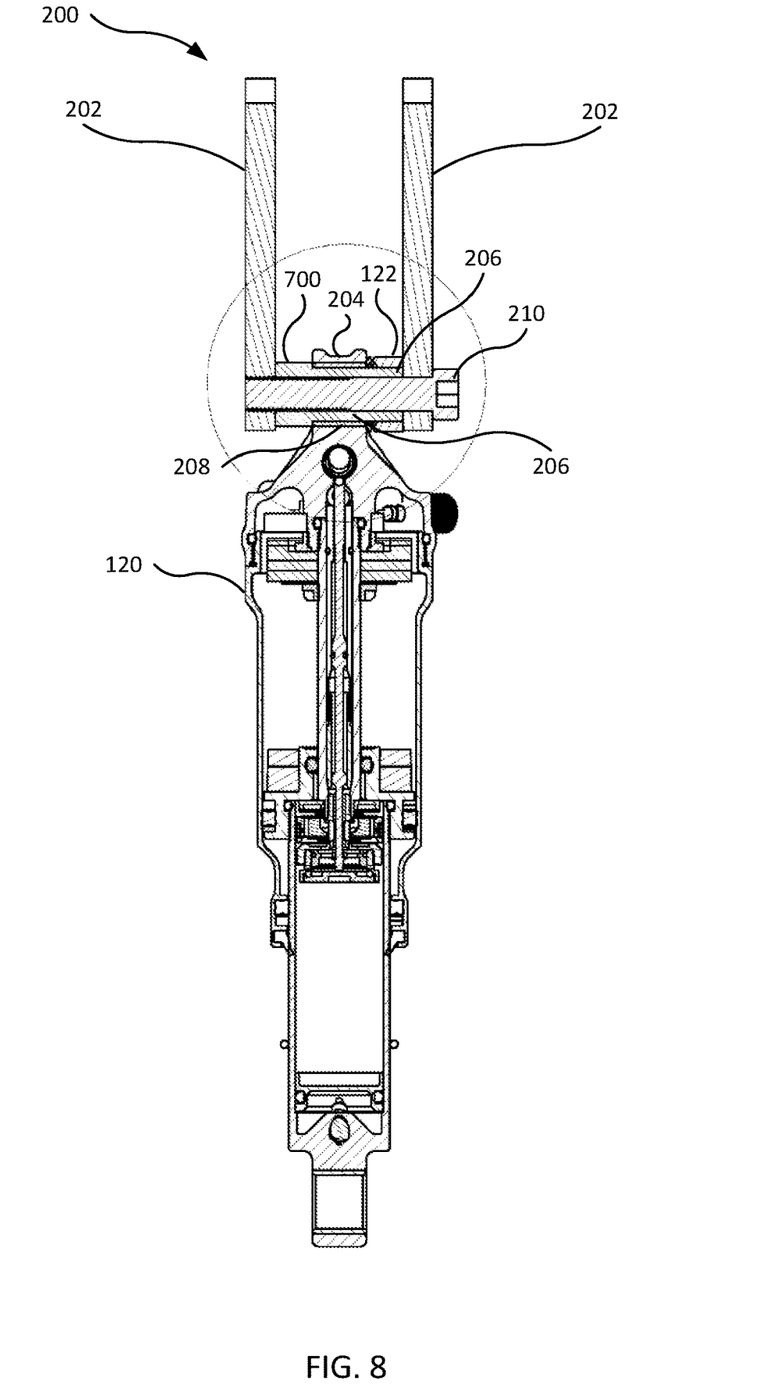
FIG. 8 is a cross-sectional view of the suspension component, flexible spacer, and mounting shaft of FIG. 7.
Figure 9A:
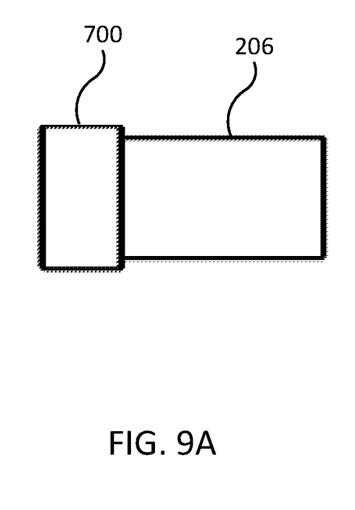
FIG. 9A is a side view of the mounting shaft of FIG. 7.
Figure 9B:
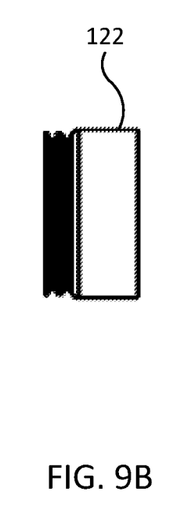
FIG. 9B is a side view of the flexible spacer of FIG. 7.
Figure 10:
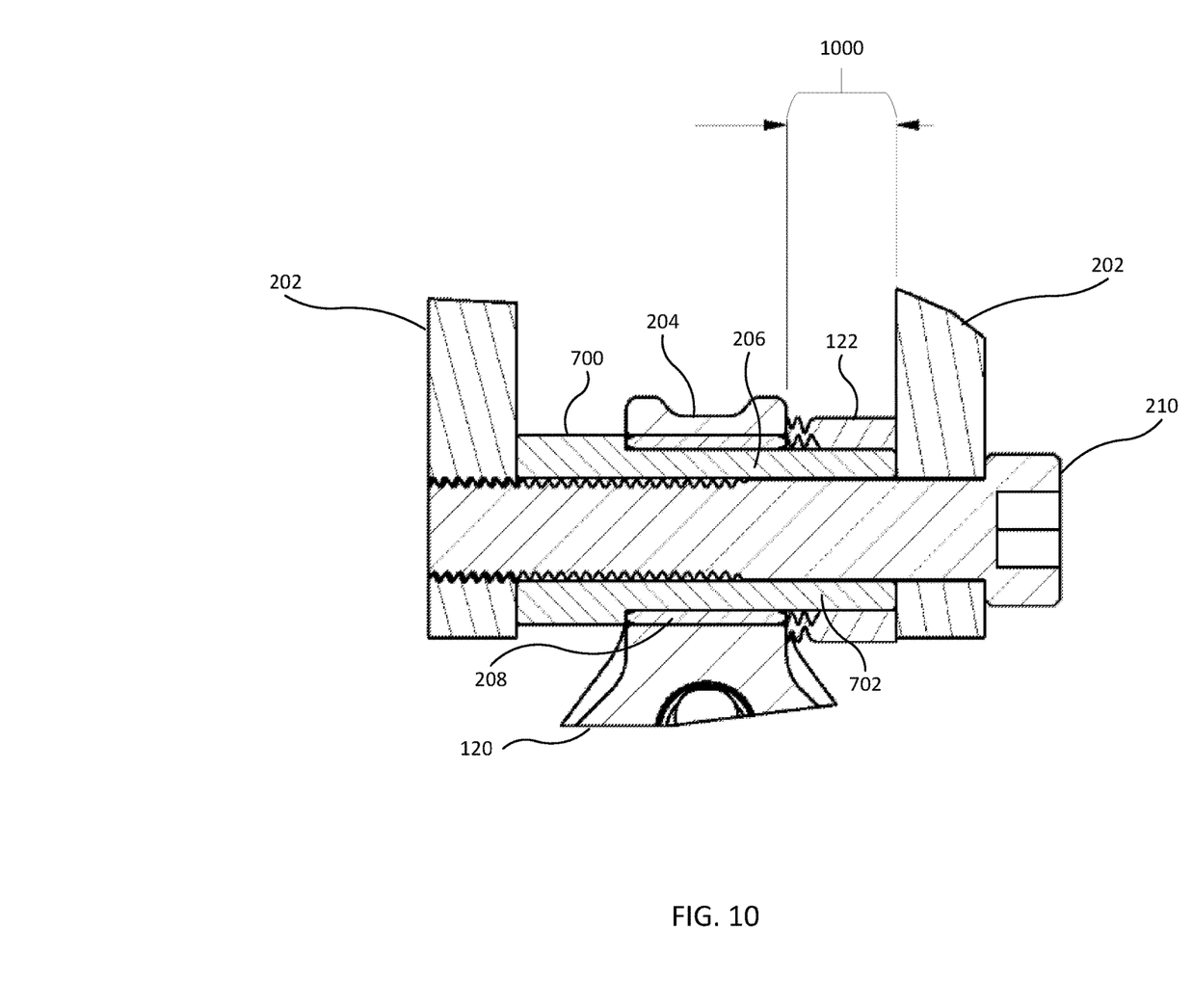
FIG. 10 is a detail view of the suspension component, flexible spacer, and mounting shaft of FIG. 8.
Figure 11A:
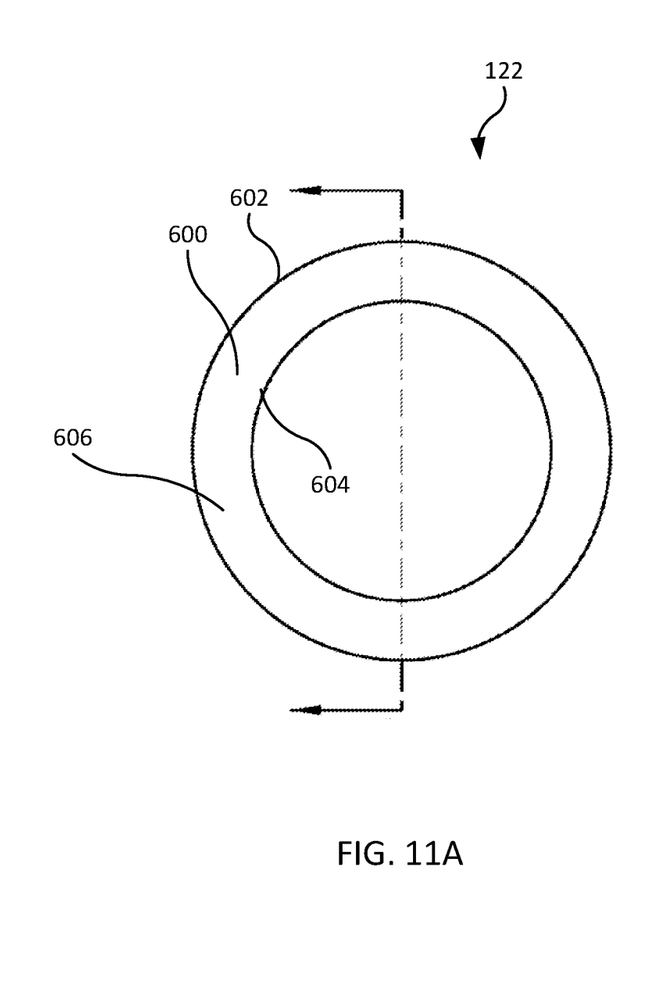
FIG. 11A is a first top-down view of the flexible spacer of FIG. 7.
Figure 11B:
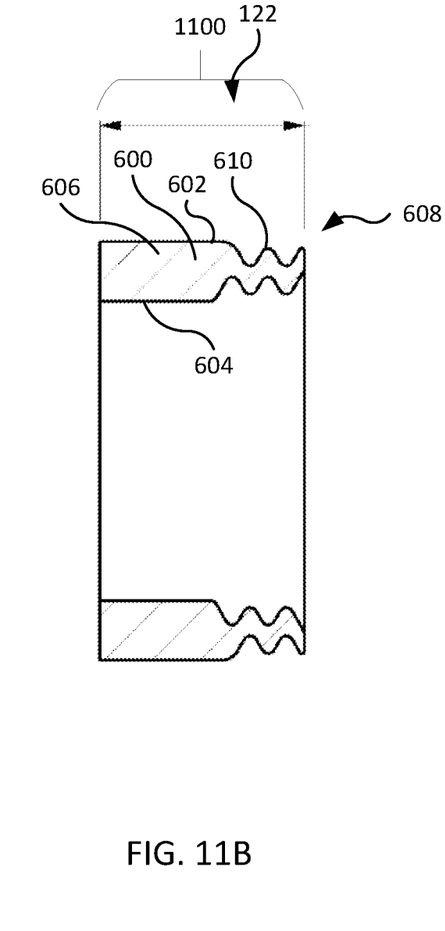
FIG. 11B is a first cross-sectional view of the flexible spacer of FIG. 11A.
Figure 12A:
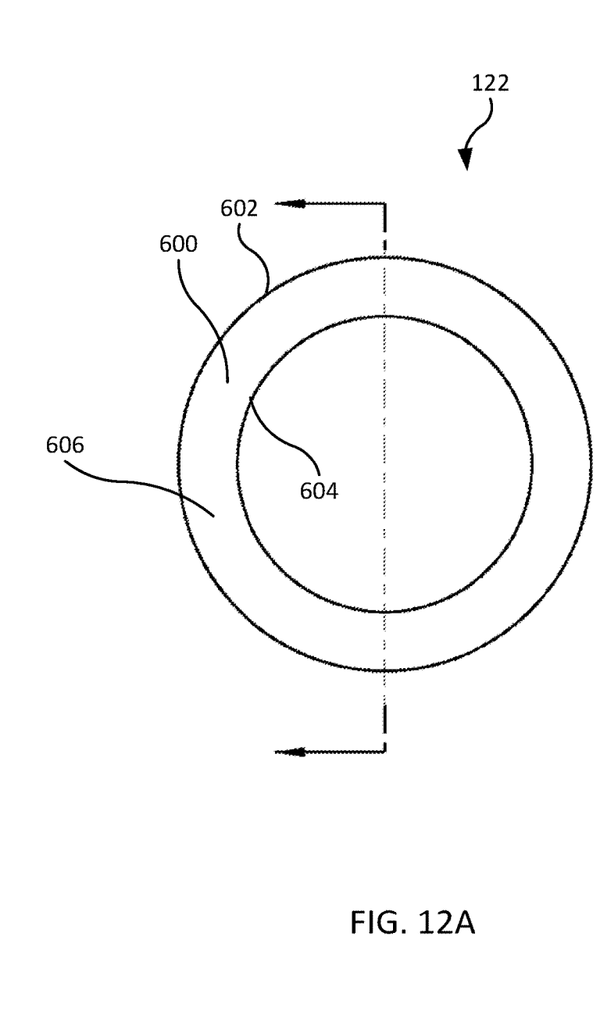
FIG. 12A is a second top-down view of the flexible spacer of FIG. 7.
Figure 12B:
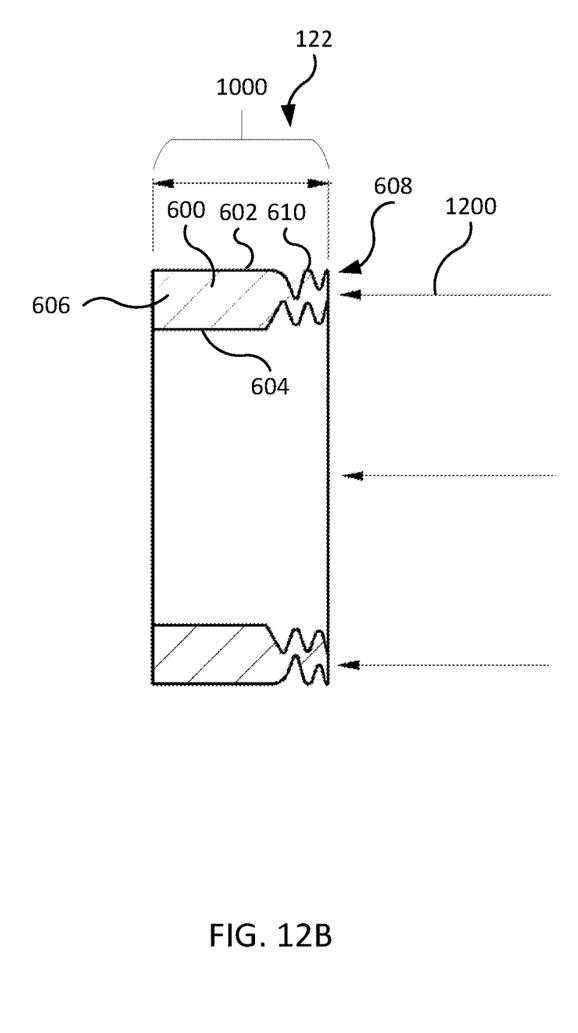
FIG. 12B is a second cross-sectional view of the flexible spacer of FIG. 11A.

Referring to FIGS. 10-12B, the suspension component 120, the flexible spacer 122, and the mounting shaft 206 of FIG. 8 are illustrated. The flexible spacer 122, as illustrated, is installed on the mounting shaft 206 and is disposed between the eyelet 204 and a mounting tab 202. The fixing member 210 may apply a clamping force 1200 across the mounting tabs 202 to secure the mounting shaft 206 in place and, thereby, secure the suspension component 120 to the frame 102 via the eyelet 204.

In the example shown in FIGS. 10-12B, the flexible portion 608 of the flexible spacer 122 includes two ridges and two valleys (e.g. articulations) to form a wave shape. In other examples, the flexible portion 608 may include more or fewer ridges, more or fewer valleys, and/or may be shaped differently.

The clamping force may compress the spacer 122, reducing the overall length of the spacer 122 to a bias force length 1000 less than an axial length 1100 of the spacer 122. The axial length 1100 may be a length of the spacer 122 when no compressive or clamping force is applied across the spacer 122. When the spacer 122 has been compressed to the bias force length 1000, the spacer 122 may exert the bias force axially or outward. When installed adjacent the eyelet 204, the spacer 122 compressed to the bias force length 1000 may exert the bias force on the eyelet 204, thereby keeping the suspension component 120 in place and preventing excess side-to side movement of the suspension component 120. When a collar 700 of the mounting shaft 206 is disposed opposite the spacer 122, the bias force may push the eyelet 204 against the collar 700.

A magnitude of the bias force may depend on the bias force length 1000 and a spring rate of the spacer 122. For example, a smaller bias force length 1000 (e.g. the spacer compressed to a greater extent) may result in or cause the spacer 122 to exert a greater bias force than a longer bias force length 1000 (e.g. the spacer compressed to a lesser extent). A stiffer (e.g. higher spring rate) spacer 122 may exert a greater bias force than a less stiff (e.g. lower spring rate) spacer 122. Additionally or alternatively, the spring rate may depend on a geometry of the spacer 122 and/or a material of the spacer 122. For example, the ratio of the length of the flexible portion to the length of the body of the spacer may affect the spring rate. A greater length of the flexible portion versus the length of the body may reduce the spring rate, and a lesser length of the flexible portion versus the length of the body may increase the spring rate.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, a mechanical shift control device may be substituted for the disclosed electronic shift control device. In another example, a mechanical brake control device may be substituted for the disclosed hydraulic brake control device. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A spacer for connecting a suspension component to a frame of a bicycle, the spacer comprising:
    a spacer body; and
    a flexible portion disposed at one end of the spacer body and configured to exert an axial bias force under deforming compression,
    wherein the spacer body and the flexible portion form a unitary part.

2. The spacer of claim 1, wherein the spacer body and the flexible portion are formed from a single material.

3. The spacer of claim 2, wherein the single material is a non-metallic material.

4. The spacer of claim 3, wherein the non-metallic material is a polymer, a plastic, or a rubber.

5. The spacer of claim 1, wherein the spacer body has an outer annular surface and an inner annular surface partially defining an annular wall that extends along a length of the spacer body, and
    wherein the annular wall does not include any openings extending radially through the annular wall.

6. The spacer of claim 5, wherein the inner annular surface of the spacer body has a diameter that is the same as or less than a diameter of an outer surface of a mounting shaft configured to connect the suspension component to the frame of the bicycle.

7. The spacer of claim 6, wherein the spacer is secured to the mounting shaft by a press-fitting.

8. The spacer of claim 1, wherein the flexible portion includes a variable cross sectional area along a length.

9. A suspension assembly for a bicycle, the suspension assembly comprising:
    a mounting portion of a suspension component;
    a mounting shaft sized and shaped to be disposed through the mounting portion of the suspension component and extend a distance to a support of the bicycle; and
    a spacer formed as a single unitary piece, the spacer spanning an entirety of the distance and being compressible in an axial direction,
    wherein the suspension component comprises a spring, a damper, or a combination thereof.

10. The suspension assembly of claim 9, wherein the spacer comprises a flexible portion having one or more circumferential ribs or circumferential ridges, and
    wherein the flexible portion is configured to exert an axial bias force under compression.

11. The suspension assembly of claim 9, wherein a diameter of an inner annular surface of the spacer is the same as or less than a diameter of an outer surface of the mounting shaft.

12. The suspension assembly of claim 9, wherein the spacer is secured to the mounting shaft by a press-fitting.

13. The suspension assembly of claim 9, wherein a flexible portion of the spacer abuts the mounting portion of the suspension component.

14. The suspension assembly of claim 9, wherein the spacer is made from a non-metallic material.

15. The suspension assembly of claim 14, wherein the non-metallic material is a polymer, a plastic, or a rubber.

16. A suspension assembly for a bicycle, the suspension assembly comprising:
    a mounting portion of a suspension component;
    a mounting shaft sized and shaped to be disposed through the mounting portion of the suspension component and extend a distance to a support of the bicycle;
    a spacer formed as a single unitary piece, the spacer spanning an entirety of the distance and being compressible in an axial direction, and
    a fixing member disposed inside of the mounting shaft and configured to secure the suspension component to the support of the bicycle.

17. A suspension assembly for a bicycle, the suspension assembly comprising:
    a mounting portion of a suspension component;
    a mounting shaft sized and shaped to be disposed through the mounting portion of the suspension component and extend a distance to a support of the bicycle; and a spacer formed as a single unitary piece, the spacer spanning an entirety of the distance and being compressible in an axial direction, wherein the mounting shaft includes a collar with a diameter greater than a diameter of a body of the mounting shaft, wherein the collar is sized and shaped to be disposable adjacent a side of the mounting portion of the suspension component and opposite the spacer.

18. A suspension component, comprising:

a mounting portion, the mounting portion having a hole; and a spacer formed as a single unitary piece, the spacer including an axially deformable portion and a rigid portion, and sized and shaped to be disposed between the mounting portion and a support of a bicycle.

\* \* \* \* \*